United States Patent [19]
Oehrle

[11] 4,135,902
[45] Jan. 23, 1979

[54] METHOD AND APPARATUS FOR DRAWING OPTICAL FIBERS

[75] Inventor: Robert C. Oehrle, Beverly, N.J.

[73] Assignee: Western Electric Co., Inc., New York, N.Y.

[21] Appl. No.: 883,074

[22] Filed: Mar. 3, 1978

[51] Int. Cl.$^2$ ............................................. C03B 37/00
[52] U.S. Cl. ............................................. 65/2; 65/13; 65/DIG. 4; 219/121 LM; 219/121 L
[58] Field of Search .......... 65/2, 13, DIG. 4, DIG. 7; 219/121 LM, 121 L

[56] References Cited

U.S. PATENT DOCUMENTS

| 3,865,564 | 2/1975 | Jaeger et al. | 65/13 X |
| 3,965,327 | 6/1976 | Ehlscheid et al. | 219/121 LM |
| 3,981,705 | 9/1976 | Jaeger et al. | 65/13 X |
| 4,012,213 | 3/1977 | Haggerty et al. | 65/13 |

*Primary Examiner*—Robert L. Lindsay, Jr.
*Attorney, Agent, or Firm*—D. J. Kirk

[57] ABSTRACT

A laser beam (FIG. 1; 28) is reflected from a first oscillating galvanometer controlled mirror (14) onto a second oscillating galvanometer controlled mirror (15). The laser beam is reflected from the second mirror as a pattern (29) having an annular cross section by individually controlling the amplitude and phase relationships of the oscillations of the mirrors. The annular beam is directed at a frustoconical reflector (21) which reflects the annular beam radially inward to heat a portion of a glass preform (25) positioned along the axis of the reflector to form a melt zone therein from which an optical fiber (36) is drawn.

Additionally, the amplitude of the mirror oscillations are modulated to vary the diameter of the annular beam to cause the beam to reciprocate along a portion of the length of the preform to expand the size of the melt zone.

14 Claims, 4 Drawing Figures

METHOD AND APPARATUS FOR DRAWING OPTICAL FIBERS

BACKGROUND OF THE INVENTION

1. Field of the Invention

The invention relates to drawing optical fibers from a glass preform. In particular, the invention is directed to methods and apparatus for forming a melt zone in a portion of the preform.

2. Description of the Prior Art

In the prior art it is well known to use lasers to form a heat zone to heat and melt a portion of a glass preform in order to draw an optical fiber therefrom. Since the laser beam is easily focused and directed by ordinary geometric optics, there are several ways in which a laser might be employed to heat glass. One or more laser beams may simply be directed at spaced sections of the surface of the glass preform, or, using beam splitting techniques, the laser beam may be made incident on the surface of the preform at a plurality of diametrically opposed points as shown in U.S. Pat. No. 4,012,213 which issued on Mar. 15, 1977 to Haggerty et al. However, to ensure uniform heating of the preform, it is preferred that the beam be made incident over substantially the entire periphery of the preform in the zone to be melted. This may be done by forming a beam having an annular cross section and directing such a patterned beam along an axis that is colinear with the axis of the fiber as it is drawn. U.S. Pat. No. 3,865,564 to Jaeger et al., which is assigned to Bell Telephone Laboratories, Incorporated and issued on Feb. 11, 1975, describes such a laser drawing apparatus.

The Jaeger et al. patent discloses a laser beam being directed through an eccentrically mounted rotatable transparent convex lens. Such a configuration focusses the incident beam at the focal point of the lens, but off the axis of rotation. By rotating the lens at a sufficiently high velocity, a patterned beam is produced which effectively has an annular cross section. The annular beam is then directed towards a frustoconical reflector which has a solid cylindrical glass preform axially disposed therein. The beam is reflected radially inward from the reflector, onto the glass preform, to heat the preform and form a melt zone from which the glass fiber is drawn. This system has been found to be most satisfactory for drawing fibers using a laser, however, the length of the heat zone so formed is relatively narrow (approximately the diameter of the laser beam). The narrow heat zone limits the amount of laser power that can be applied before vaporization of the preform material occurs, which, in turn, limits the diameter of the preform which can be melted.

SUMMARY OF THE INVENTION

The instant invention substantially overcomes the foregoing problems associated with the drawing of the fiber from a preform by reflecting a beam of high energy radiation from a first oscillating mirror onto a second oscillating mirror while controlling the oscillations of the mirrors to cause a predetermined pattern to be generated. The patterned beam is then directed onto the preform to form a melt zone from which the fiber is drawn. Furthermore, by modulating the oscillations of the mirrors, the beam pattern may be altered to expand the size of the melt zone.

Apparatus to implement the above method comprises first and second reflecting means capable of oscillatory motion, means for controlling the operation of the first and second reflecting means to reflect a beam of high energy radiation therefrom in such a manner as to form a predetermined pattern and means for directing the patterned beam onto the preform to form a melt zone from which a fiber may be drawn. In addition, apparatus is provided to modulate the oscillations of the first and second reflecting means to expand the size of the melt zone.

Advantageously, the instant apparatus can deflect the beam over a wide range of rotation speeds. Further, the rotational speed may be rapidly changed.

In addition, the instant system substantially eliminates vibration and attendant realignment problems.

Furthermore, by changing the amplitude, frequency and/or phase of the signals controlling the first and second galvanometers, a variety of output patterns may be obtained to modify the size and shape of the heat zone.

A most important advantage is that by expanding the size of the heat zone a larger amount of total power can be applied to the preform resulting in deeper penetration of the heat, permitting the melting of larger diameter preforms with substantially no vaporization.

DETAILED DESCRIPTION OF THE PREFERRED EMBODIMENT

The preferred embodiment of the present invention is directed to the fabrication of glass fibers from a melt zone formed in a glass preform by a beam of high energy radiation. It is generally contemplated that the composition of the glass fibers includes amorphous inorganic oxides, such as fused silica, doped silica compositions, borosilicate compositions, soda-lime-silica compositions, etc. However, the fiber composition may also include other amorphous materials, such as plastics, which evidence a sufficiently low viscosity at some elevated temperature to permit fibers to be drawn from a melt thereof.

Figure 1:
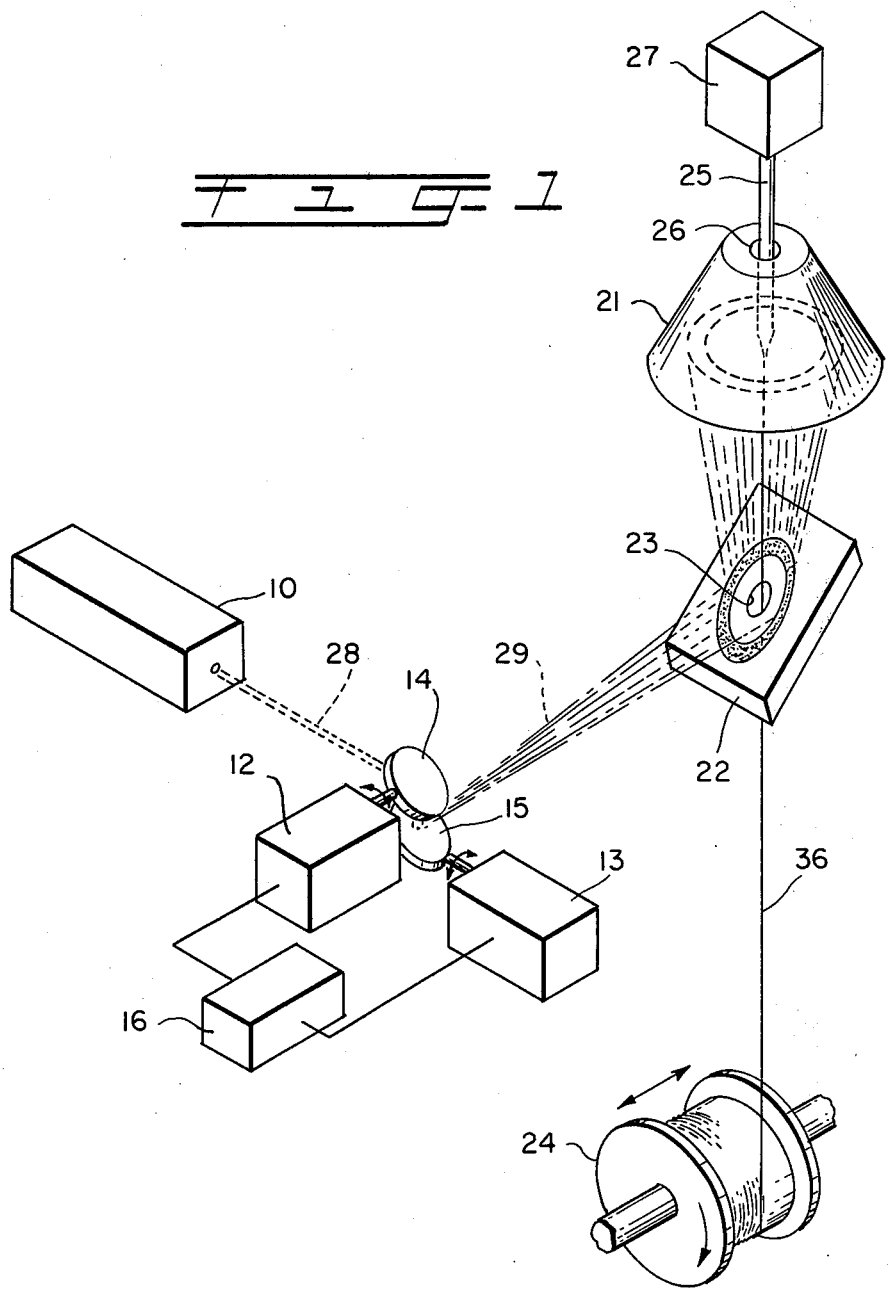
FIG. 1 is a perspective view of an apparatus in accordance with the instant invention.

FIG. 1 depicts an exemplary embodiment of an apparatus for drawing a fiber from a preform. The apparatus comprises a high energy radiation source such as a laser 10, first and second galvanometers 12 and 13 having first and second low mass mirrors 14 and 15, respectively, and an oscillator control circuit 16. A frustoconical reflector 21, a fixed mirror 22, having an aperture 23 therein, and a take-up reel 24 are mounted in vertical alignment and spaced from the mirrors 14 and 15.

Figure 2:
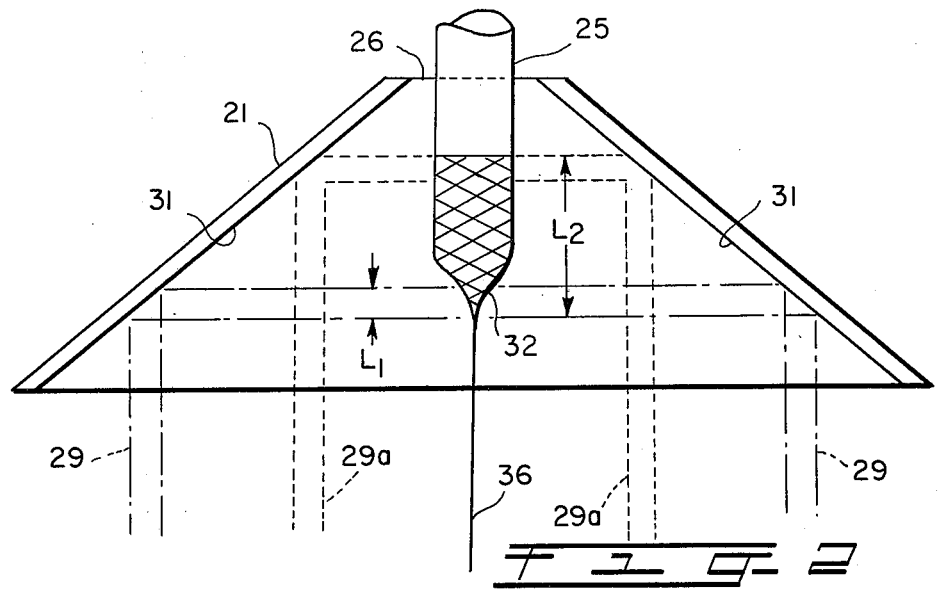
FIG. 2 is a cross-sectional view of a frustoconical reflector with a preform axially inserted therein.

In operation, a substantially cylindrical optical fiber preform 25 is fed through an opening 26 along the axis of the reflector 21 by a feed means 27. A laser beam 28, generated by the laser 10, is reflected by the first low mass mirror 14 which oscillates at a first predetermined frequency. The beam 28 is reflected onto the second low mass mirror 15, which is mounted in orthogonal relationship to the mirror 14, and oscillates at a second predetermined frequency, to produce a beam pattern 29 which is directed onto the fixed mirror 22 which reflects the pattern by 90° into the frustoconical reflector 21. As can best be seen in the cross-sectional view of FIG. 2, the patterned beam 29 is reflected from an inner surface 31 of the reflector 21 onto the preform 25 to heat and form a melt zone 32 having a length $L_1$ in the preform. An optical fiber 36 is drawn from the melt zone 32 through the aperture 23 in mirror 22, onto the take-up reel 24.

Figure 3:
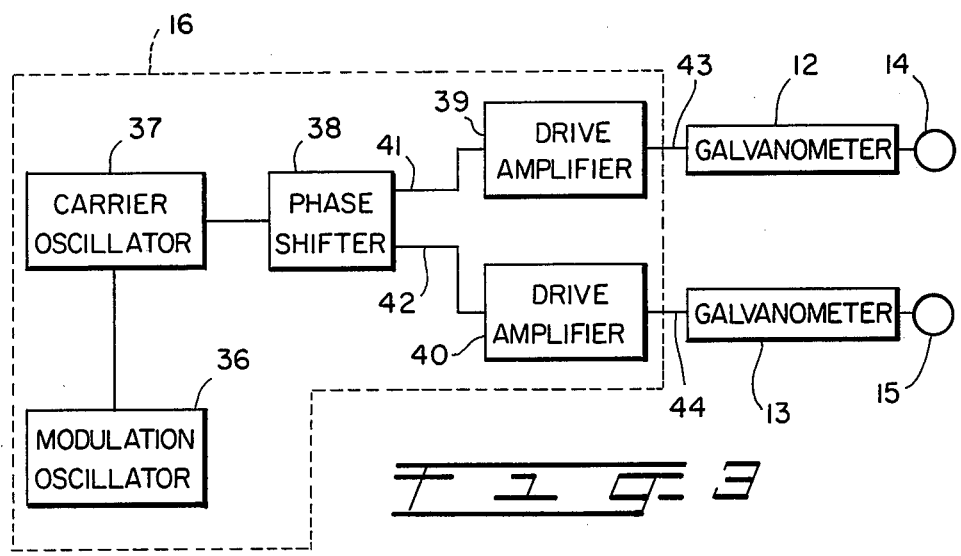
FIG. 3 is a block diagram directed to the operation of the galvanometer controlled mirrors.

The oscillator control circuit 16, which controls the operation of the galvanometers 12 and 13, to which the oscillating mirrors 14 and 15 are rotatably affixed, is shown in block diagram form in FIG. 3. The control circuit 16 is comprised of a modulation oscillator 36, a carrier oscillator 37 and a phase shifter 38 connected in tandem relationship. First and second drive amplifiers 39 and 40 are connected to the output of the phase shifter 38 by first and second leads 41 and 42, respectively. The drive amplifiers 39 and 40 are connected to the galvanometers 12 and 13 by leads 43 and 44, respectively.

The oscillator control circuit 16 in combination with the galvanometer controlled mirrors 14 and 15 provide a flexibility not heretofore obtainable in prior art fiber drawing systems. For example, to form a pattern 29 having an annular cross section, the mirrors 14 and 15 are positioned in orthogonal relationship as shown in FIG. 1. A sinusoidal signal is then generated by the carrier oscillator 37 and forwarded to the phase shifter 38 which produces substantially identical sinusoidal outputs on each of the leads 41 and 42 which are 90° out of phase. The out-of-phase sinusoidal signals are amplified by the drive amplifiers 39 and 40 and forwarded to the galvanometers 12 and 13, respectively, causing the orthogonally mounted mirrors 14 and 15 to oscillate at substantially the same amplitude and 90° out of phase.

The laser beam 28 reflected by the orthogonally mounted oscillating mirrors 14 and 15 will be formed into the annular pattern 29 which is further reflected from the fixed mirror 22 into the frustoconical reflector 21 and directed onto the preform 25 to form the melt zone 32 having a length $L_1$. Such a system can provide higher beam rotation velocities (approximately 500 hertz) than prior art systems as well as decreasing maintenance while providing a beam patterning apparatus having an increased useful lifetime. It should be clear that various patterns can be generated by positioning the mirrors 14 and 15 in other than an orthogonal relationship.

Additionally, by changing the diameter of the patterned beam between the beam indicated by the broken lines 29, and those shown as dashed lines 29a, the length of the melt zone may be extended to length $L_2$. This may be accomplished by simply modulating the amplitude or the frequency of the carrier signal from oscillator 37 to the galvanometers 39 and 40. Decreasing the diameter of the annular pattern 29 results in the beam reflecting higher in the frustoconical reflector 21 causing the melt zone 32 to increase longitudinally along the axis of the preform 25 from length $L_1$ to length $L_2$. Accordingly, a modulation signal from the modulation oscillator 36 is forwarded to the carrier oscillator 37 to modulate the carrier with a 100 hertz signal which will result in the annular pattern 29 traversing the melt zone 32, perpendicular to the axis of the preform 25, every 10 milliseconds. Such reciprocation of the annular beam pattern 29 along a peripheral portion of the length of the preform 25 increases the area upon which the beam impinges and provides time for the heat to penetrate further into the material without causing vaporization thereof.

For example, a fiber 36 was drawn from a preform 25 having a diameter of 5mm that had a heat zone length to preform diameter ratio of 2.4 using a power of 300 watts. Normally, with the prior art systems in which the beam was not reciprocated, 300 watts would create excessive vaporization on a 5mm preform. However, the instant system, using the expanded heat zone, did not exhibit any observable vaporization. Thus, it can be seen that the expanded heat zone, formed by reciprocating the patterned beam 29 along a portion of the length of the preform 25, allows the laser power to be substantially increased without causing excessive vaporization. This, in turn, permits a melt to be formed in larger diameter preforms and the fiber 36 drawn at higher speeds depending only on the available laser power.

In a particular working embodiment, the laser 10 was a $CO_2$ laser operating at a wavelength of 10.6 $\mu$m at 300 watts. It should be clear that the instant invention is not limited to the use of the laser 10 as the high energy radiation source. Any form of high energy radiation, including solar energy, which can be focussed and reflected from the mirrors 14 and 15, may be used to implement the instant inventive concepts.

The galvanometers 12 and 13 were model G-302 purchased from General Scanning Co. which were operated at approximately 2° peak-to-peak scanning range. The drive amplifiers 39 and 40 were model AX-200 purchased from General Scanning Company, each having an input impedance of 100K ohms and an input range of $-1$ to $+1$ volts with a frequency response of 0 to 50KHZ. The carrier oscillator 37 and the modulation oscillator 36 may be any one of many well-known frequency generators such as Wavetex Model #144.

The phase shifter 38 may be any circuit arranged to receive a substantially sinusoidal signal to generate a duplicate pair of signals which are 90° out of phase. One such circuit is shown in detail in FIG. 4. The phase shifter 38 is comprised of a resistor 49 connected between an input terminal 51 and a negative input of a first amplifier 52 which has a grounded positive input. A resistor 53 is connected between the negative input and an output 54 of the amplifier 52. A first potentiometer 56 is connected between the output 54 and ground, and tap 57 is connected to the output lead 41. The output 54 is also connected to a negative input of a second amplifier 58 via a capacitor 59. A resistor 61 is connected between the negative terminal and an output 62 of the second amplifier 58 while the positive input terminal is grounded. The output 62 is also connected to ground via a second potentiometer 63 and terminal 64 is connected to the output lead 42.

Figure 4:
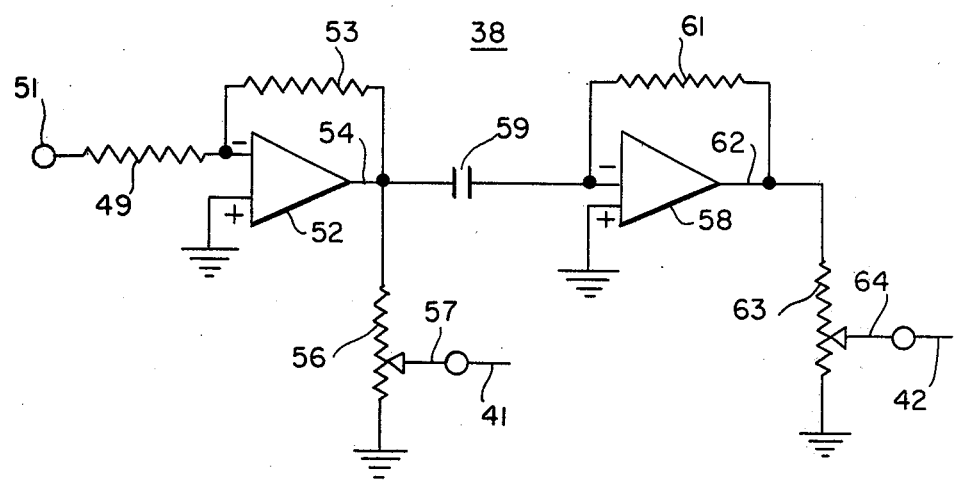
FIG. 4 is a circuit diagram of a frequency shifter used in accordance with the instant invention.

In operation, the carrier signal from the carrier oscillator 37 is presented to the input terminal 51 of the phase shifter circuit 38 as shown in FIG. 4. The resistors 49 and 53 establish the gain of the amplifier 52 while the potentiometer 56 provides a variable voltage control to ensure that the proper signal level is forwarded to the drive amplifier 39 (see FIG. 3) via the lead 41. A portion of the signal output from the amplifier 52 is forwarded through the capacitor 59 to the negative input of the second amplifier 58. The gain of the amplifier 58 is determined by the proper selection of the capacitor 59 and the resistor 61. The output of the amplifier 58 is a substantially sinusoidal signal which is 90° out of phase with the signal input at terminal 51. The second potentiometer 63 selects a portion of the phase shifted signal from the amplifier 58 and directs the 90° out-of-phase signal to the drive amplifier 49 via the lead 42.

The mirrors 14 and 15 in the exemplary embodiment were made of beryllium and each had a mass of approximately 2.8 grams. Heavier copper, copper-beryllium or similar materials may be used, but the carrier and modulation frequencies would have to be lower. The frustoconical reflector 21 was substantially the same as that shown in U.S. Pat. No. 3,981,705 to Jaeger et al. which issued on Sept. 21, 1976. However, other commercially available frustoconical reflectors, smooth or multifaceted, may be used to implement the instant inventive concepts.

The exemplary embodiment makes use of two orthogonally mounted galvanometer controlled mirrors 14 and 15 to obtain an annular laser pattern 29 which may be expanded and contracted in diameter to form an expanded melt zone $L_2$ in a preform 25. However, the invention is not so limited, for the pattern may be dynamically altered by continuously changing the carrier or modulation frequencies. For instance, the modulating frequency may be a saw-toothed wave which will result in a uniform distribution of heat along the axis of the preform 25. A sinusoidal waveform will cause an increase in the heat at the top and bottom of the melt zone $L_2$. By choosing the proper modulation waveform, the temperature of the heat zone can be modified to conform with the desired geometry of the melt zone. Additionally, other patterns, such as an oval, produced by decreasing the carrier signal amplitude of one galvanometer will permit the production of non-symmetrical fibers.

It should also be clear to one skilled in the art to which this invention pertains that the invention is not limited to the use of a frustoconical reflector 21. For instance, in order to provide a non-uniform heat distribution in preform 25, a reflector 21 having an irregular or other predetermined surface contour may be used to reflect the patterned beam to obtain the desired distribution.

What is claimed is:

1. A method of drawing a fiber from a preform, comprising the steps of:
   reflecting a beam of high energy radiation from a first oscillating mirror onto a second oscillating mirror;
   controlling the oscillations of the mirrors to cause a predetermined pattern to be reflected from the second mirror;
   directing the patterned beam onto the preform to form a melt zone therein; and
   drawing the fiber from the melt zone.

2. The method of drawing a fiber as set forth in claim 1, characterized by:
   reflecting the patterned beam from a frustoconical reflector to direct said beam onto the preform which is axially positioned therein.

3. The method as set forth in claim 1, characterized by:
   positioning the first and second mirrors in orthogonal relationship; and
   causing both mirrors to oscillate at substantially the same amplitude and frequency, but out of phase by 90°, to form a beam pattern having an annular cross section.

4. The method as set forth in claim 3, which is further characterized by:
   modulating the oscillations of the mirrors to alter the diameter of the annular pattern to distribute the heat in the melt zone in a predetermined manner.

5. The method as set forth in claim 4, which is characterized by:
   modulating the amplitude of the mirror oscillations to reciprocate the annular beam pattern along a portion of the length of the preform to expand the size of the melt zone.

6. The method as set forth in claim 4, which is further characterized by:
   modulating the frequency of the mirror oscillations to reciprocate the annular beam pattern along a portion of the length of the preform to expand the size of the melt zone.

7. The method as set forth in claim 5, characterized in that:
   the modulating signal is in the form of a saw-toothed wave.

8. The method as set forth in claim 5, characterized in that:
   the modulating signal is in the form of a sine wave.

9. A method of drawing an optical fiber from a preform having a cylindrical cross section, comprising the steps of:
   reflecting a laser beam from a first oscillating mirror onto a second oscillating mirror mounted in orthogonal relationship to the first mirror;
   oscillating the mirrors at the same amplitude and frequency but 90° out of phase to form a patterned laser beam having an annular cross section;
   reflecting the annular beam, from a frustoconical reflector, onto the periphery of a portion of the preform which is axially positioned therein, to form a melt zone in the preform of length $L_1$;
   modulating the amplitude of the oscillating mirrors to reciprocate the annular beam axially of the preform to extend the melt zone to a length $L_2$, where $L_2 > L_1$; and
   drawing the optical fiber from the extended melt zone.

10. Apparatus for drawing a fiber from a preform, comprising:
    first and second reflecting means, capable of oscillatory motion, for reflecting a beam of high energy radiation;
    means for oscillating the mirrors to cause a predetermined beam pattern to be formed;
    means for directing said patterned beam onto said preform to form a melt zone; and
    means for drawing the fiber from the melt zone.

11. The fiber drawing apparatus as set forth in claim 10, wherein:
    the directing means is a frustoconical reflector.

12. The fiber drawing apparatus as set forth in claim 10, which further comprises:
    means for modulating the oscillations of the mirrors to distribute the heat in the melt zone in a predetermined manner.

13. The fiber drawing apparatus as set forth in claim 10, wherein:
    the first and second reflecting means are galvanometer controlled oscillating mirrors mounted in orthogonal relationship; and
    both mirrors are arranged to oscillate at substantially the same amplitude and frequency, but out of phase by 90°, to form an annular beam pattern.

14. An apparatus for drawing an optical fiber from a preform having a cylindrical cross section, comprising:
a first mirror capable of oscillatory motion;
a second mirror capable of oscillatory motion that is 90° out of phase with the motion of the first mirror and is mounted in orthogonal relation to the first mirror;
a laser to generate a beam which is reflected from the first mirror to the second mirror to form a patterned beam having an annular cross section reflected from the second mirror;
a frustoconical reflector to reflect the annular beam toward the preform, fed axially therein, to form a melt zone in a portion of the preform;
a modulation apparatus to modulate the oscillatory motion of the mirrors to vary the diameter of the annular pattern to expand the size of melt zone; and
a drawing apparatus to draw the optical fiber from the melt zone.

* * * * *